C. P. BYRNES.
METHOD OF AND APPARATUS FOR DRAWING HOLLOW GLASS.
APPLICATION FILED FEB. 4, 1914. RENEWED MAY 29, 1919.
1,326,571. Patented Dec. 30, 1919.
2 SHEETS—SHEET 1.
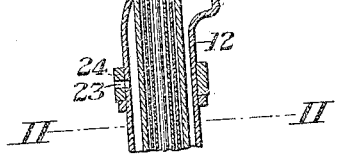
WITNESSES
INVENTOR
Clarence P. Byrnes

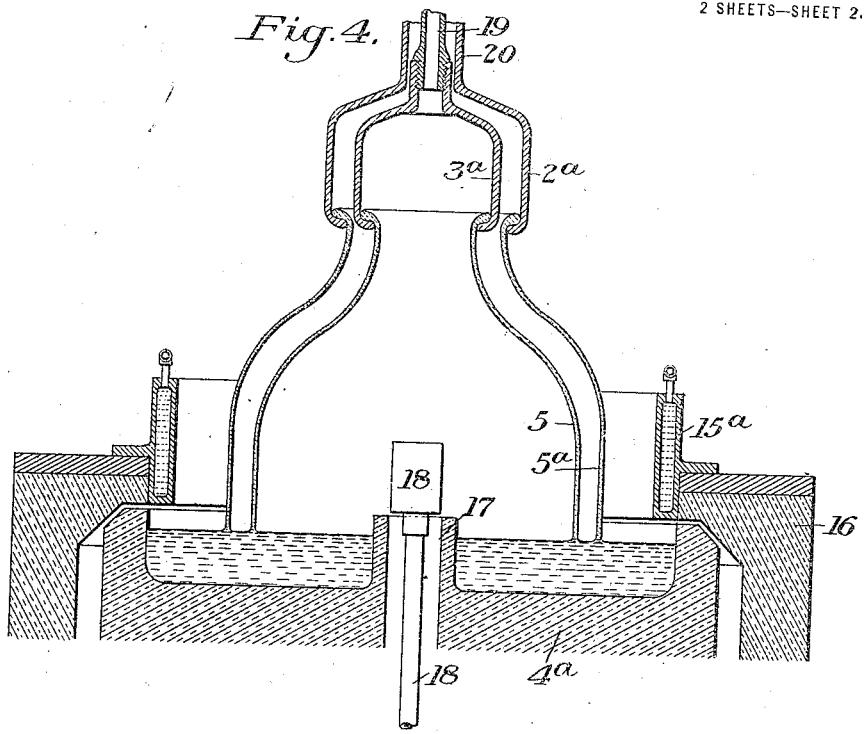
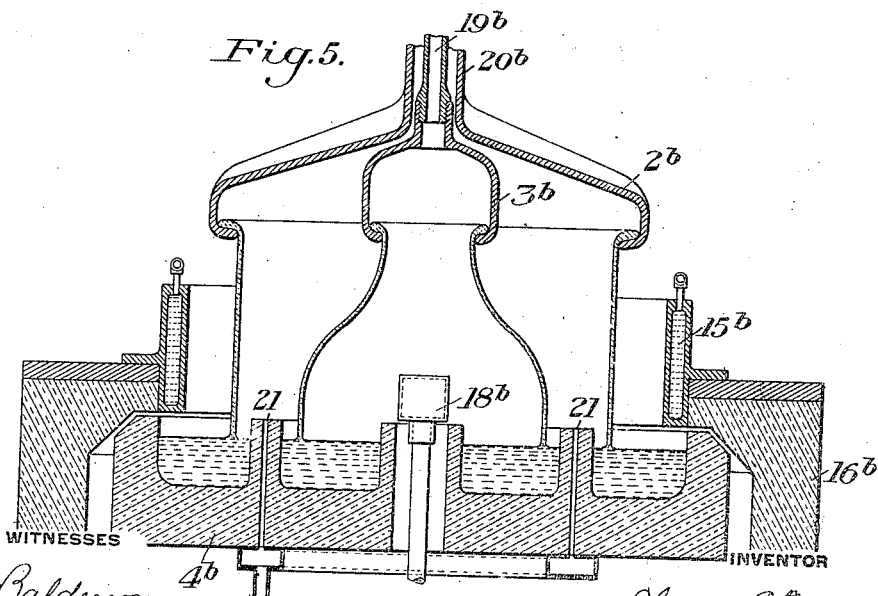

UNITED STATES PATENT OFFICE.

CLARENCE P. BYRNES, OF SEWICKLEY, PENNSYLVANIA.

METHOD OF AND APPARATUS FOR DRAWING HOLLOW GLASS.

1,326,571.     Specification of Letters Patent.     Patented Dec. 30, 1919.

Application filed February 4, 1914, Serial No. 816,507. Renewed May 29, 1919. Serial No. 300,783.

*To all whom it may concern:*

Be it known that I, CLARENCE P. BYRNES, a citizen of the United States, residing at Sewickley, in the county of Allegheny and State of Pennsylvania, have invented a new and useful Improvement in Methods of and Apparatus for Drawing Hollow Glass, of which the following is a full, clear, and exact description, reference being had to the accompanying drawings, forming part of this specification, in which—

Figure 1 is a vertical section showing a portion of one form of apparatus constructed in accordance with my invention.

Figs. 2 and 3 are cross sections on lines II—II and III—III, respectively, of Fig. 1, and Figs. 4 and 5 are views similar to Fig. 1, showing other forms embodying my invention.

My invention relates to hollow glass articles, such as window glass rollers or cylinders, and is designed to increase the output and decrease the loss of glass in the pots or receptacles. It is also designed to provide for the drawing of hollow walled or jacketed receptacles which may be provided with vacuum between the walls.

The invention consists in drawing a plurality of hollow articles one within the other. It also consists in supplying air to each of these hollow articles, the air being either from a common supply, or separate air supplies being used at different pressures, if desired. The hollow articles may be held distended by other means, if desired. It also consists in special cooling means for causing setting of the glass of the interior articles, and in other features hereinafter described and claimed.

In the drawings, referring to the form of Figs. 1, 2 and 3; 2 and 3 represent concentric "cold baits" of the general form now used in the drawing of window glass cylinders. When these cold baits are lowered into the glass bath in the pot or receptacle 4, the glass flows in on the interior ledges of the baits and chills thereon sufficiently to support the cylinder being drawn. The baits are lifted from the bath before the metal of the baits is sufficiently hot for the glass to stick to it and the baits are preferably held above the bath until the glass is chilled on the ledges before further drawing hot baits, or other types of baits may be employed, if desired.

Air is shown as supplied to the inner glass cylinder 5 being drawn, through the inner pipe 6 of two concentric pipes 6 and 7. A cooling box 8 may be secured to the outer pipe 7, the inner pipe extending through this cooling box. A water supply pipe 9 extends down within the inner air pipe and a branch 10 extends through the wall of the air pipe into the water box where it joins a circular nozzle 11 through which the water passes into this box. This cooling water flows back into the space between the pipes 6 and 7 and may be taken off in any suitable manner.

The outer cylinder 5ª is supplied with air through a chamber or pipe 12 surrounding the supporting pipe 13 for the inner bait, the casing 12 being supplied with air through a pipe 14. The baits are lifted by means of pipes 13 and 14 and they rise over the inner pipe system during the drawing operation. The pipes shown may be connected to suitable supply pipes on the lifting cage of the elevator device or connected up in any suitable manner to allow the vertical movement of the baits and outer air supply.

I may also use an external cooling device which I have shown as a water cooling device 15 in the form of a ring surrounding the outer cylinder and resting on the top stone of the furnace 16 which contains the pot 4.

In using the apparatus, the baits may be lowered either simultaneously or successively into the glass or batch, air being supplied to the inner cylinder and to the space between the two cylinders preferably in such a manner as to expand the cylinders as shown. After they are expanded to the desired size, the drawing operation may go on with the air supplies under proper control of the lifting apparatus, as is common in this art. The pressures of the two air supplies may be varied at will by use of hand valves under control of the operator.

By thus drawing a plurality of concentric cylinders, the output of glass per turn may be largely increased, the loss from ladling, waste in the pot, etc., reduced, and the labor cost lessened.

Instead of drawing the baits up over the inner stationary air supply, I may supply air at the top of the inner bait, the air pipe lifting with the bait and I may use a cooling device which projects up into the body instead of the cooling device shown in Figs. 1 and 3.

I have shown the inner bait pipe as provided with a vent hole 22 and the outer jacket 12 as provided with a vent hole 23, these being controlled by circularly adjusted collars 24.

In Fig. 4, I show a system similar to that of Fig. 1, except that the pot has a central hole with a raised boss 17 surrounding it, the water cooling device 18 projecting up through this hole in the pot. Air may also be supplied to the inner cylinder through this hole in the pot if desired. As shown, air is supplied through the pipe 19 connected to the inner bait 3ᵃ, the outer air flowing through the pipe 20 connected to the outer bait 2ᵃ.

In Fig. 5, I show a form similar to that of Fig. 4, except that the air between the cylinders may be supplied through an annular raised and slotted ring portion 21 extending around the intermediate portion of the pot with a glass bath on either side thereof. In this form, air may be also supplied to the inner cylinder through the central hole in the pot and around the cooling device shown, or air may be supplied both through the supporting pipes for the baits and through the pot orifices, as desired.

This system not only provides for increased output at a lower labor cost and loss of glass, but it also provides means for forming jacketed glass cylinders in which the space between the two walls may be used as vacuum insulating space. Thus, in the form of Fig. 5, by increasing the pressure in the inner cylinder shortly after the draw begins the walls of the two cylinders may be united above the ring portion 21, this ring holding the walls apart below the joined portion so that the jacketed space may be continued in further drawing. After the pressure has been increased in the inner cylinder it is again decreased in forming the next jacketed cylinder, the pressure in the inner cylinder being increased, or the pressure between the cylinders decreased, to bring the walls together, and these pressures resuming their normal degree thereafter to draw the next double wall jacket. When the drawing has reached the desired length, the walls may be brought together by increasing the pressure of air in the inner cylinder or reducing the pressure between the cylinders, thus providing a double walled or jacketed cylinder. The double-walled article may be left open at either end, this end being afterward closed to form the vacuum space. The cylinder, or cylinders, may be cut off from the glass of the bath in any desired manner, either by cracking off, shearing, or hot gas currents. The cooling devices may be so arranged that one of the cylinders may be thicker than the other; for example, the outer cylinder may be made double thick and the inner cylinder of single strength or thickness.

By varying the vent holes for the two bait supports, a common air supply may be used, while at the same time the pressure may be varied as between the pressure in the inner article and the pressure between the two articles. This may also be varied by a valve device controlling the air flowing from one supply to the other through the carrier for the inner bait. By the word "simultaneously" in my claims, I intend to cover the drawing of the two hollow articles simultaneously through either a portion, or the major part, or the whole, of the drawing operation.

The baits may be movable independently of each other or may constitute a part of the same structure; the air may be supplied in different ways; cooling devices may or may not be employed; other means for holding the articles distended or preventing their contracting inwardly may be used; the articles may be drawn from the furnace or a forehearth extension thereof; hot baits may be used, and many other variations may be made in the apparatus and process without departing from my invention, since I consider myself to be the first to draw two concentric hollow glass articles one within the other.

I claim:

1. In the method of drawing glass, the step consisting in drawing a plurality of hollow glass articles one within the other; substantially as described.

2. The method of drawing glass, consisting in drawing a plurality of hollow concentric glass articles upwardly simultaneously from a bath of molten glass; substantially as described.

3. In the method of drawing glass, the steps consisting in drawing two hollow glass shapes one within the other and holding each of said shapes distended during at least a portion of the drawing of the shape, substantially as described.

4. In the method of drawing glass, the steps consisting in drawing two separated hollow glass shapes simultaneously one within the other, and supplying air to hold at least one of said shapes distended during the operation of drawing the said shapes, substantially as described.

5. The method of drawing glass, consisting in drawing two hollow concentric glass articles upwardly simultaneously from a bath of molten glass, and supplying air both to the inner cylinder and the outer cylinder; substantially as described.

6. The method of drawing glass, consisting in simultaneously drawing two concentric hollow glass articles, admitting air to expand the articles to a larger size, and continuing the draw while maintaining air between the two cylinders; substantially as described.

7. The method of drawing glass, consisting in simultaneously drawing two separated hollow glass articles one surrounding the other, expanding one of said articles to a larger size while keeping the articles separated and continuing the drawing operation while holding the expanded article distended, substantially as described.

8. The method of drawing glass, consisting in drawing two glass cylinders upwardly, said cylinders being concentric with each other and with the wall of the receptacle containing molten glass; substantially as described.

9. The method of drawing glass, consisting in drawing a plurality of hollow glass articles one within the other, supplying air to the interior of said articles, and varying the pressures within the respective articles being drawn, substantially as described.

10. The method of drawing glass, consisting in drawing two hollow glass articles upwardly one within the other, and supplying air at a constant level to at least one of said articles during the drawing operation while maintaining the articles separated from each other, substantially as described.

11. Apparatus for drawing hollow glass articles, comprising two concentric baits, and means for supplying air to the interior of each hollow article drawn up by said baits; substantially as described.

12. In glass drawing apparatus, two hollow baits one surrounding the other, and means for supplying air to each bait; substantially as described.

13. In glass drawing apparatus, two hollow baits one surrounding the other, and means for supplying air to each bait, together with means for regulating the air supplies independently to each other; substantially as described.

14. Apparatus for drawing hollow glass articles, comprising two baits one surrounding the other, means for supplying air to the interior of the articles, and regulating devices arranged to allow varying of the air supplied to the articles, substantially as described.

15. In glass drawing apparatus, a support having two concentric bait-engaging surfaces for the glass, and means for supplying air to each of the concentric articles being drawn, substantially as described.

16. In apparatus for drawing hollow glass articles, a plurality of independently movable baits surrounding each other, and means for moving said baits upwardly, substantially as described.

17. In apparatus for drawing hollow glass articles, a plurality of independently movable baits surrounding each other, means for moving said baits upwardly, and means for maintaining different pressures within the different articles, substantially as described.

18. In apparatus for drawing glass, a plurality of baits surrounding each other and movable relatively to each other, means for holding each of the articles distended, and mechanism for varying the amount of distention, substantially as described.

19. In apparatus for drawing glass, a plurality of hollow glass-engaging bait elements surrounding each other and arranged to simultaneously draw a plurality of hollow glass articles surrounding each other, substantially as described.

In testimony whereof I have hereunto set my hand.

CLARENCE P. BYRNES.

Witnesses:
GEO. B. BLEMING,
H. M. CORWIN.